US012802642B2

(12) United States Patent
Kim

(10) Patent No.: US 12,802,642 B2
(45) Date of Patent: Nov. 17, 2026

(54) LEVEL SHIFTER AND DISPLAY DEVICE INCLUDING THE SAME

(71) Applicant: LG Display Co., Ltd., Seoul (KR)

(72) Inventor: Byung Hee Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/356,819

(22) Filed: Oct. 13, 2025

(65) Prior Publication Data

US 2026/0171019 A1 Jun. 18, 2026

(30) Foreign Application Priority Data

Dec. 16, 2024 (KR) ........................ 10-2024-0186643

(51) Int. Cl.
*G09G 3/3233* (2016.01)

(52) U.S. Cl.
CPC ... *G09G 3/3233* (2013.01); *G09G 2310/0289* (2013.01); *G09G 2310/08* (2013.01); *G09G 2330/021* (2013.01); *G09G 2330/06* (2013.01)

(58) Field of Classification Search
CPC ......... G09G 3/3233; G09G 2310/0289; G09G 2310/08; G09G 2330/021; G09G 2330/06
See application file for complete search history.

(56) References Cited

U.S. PATENT DOCUMENTS

| | | | | |
|---|---|---|---|---|
| 2004/0125067 | A1* | 7/2004 | Kim | G09G 3/3696 345/98 |
| 2018/0012542 | A1* | 1/2018 | Lee | G09G 3/3275 |
| 2021/0097939 | A1* | 4/2021 | Chae | G09G 3/3688 |
| 2022/0383803 | A1* | 12/2022 | Jang | G09G 3/32 |
| 2024/0013695 | A1 | 1/2024 | Chae et al. | |

FOREIGN PATENT DOCUMENTS

| | | | | | |
|---|---|---|---|---|---|
| CN | 113126809 | B | * | 9/2023 | G06F 3/4012 |
| KR | 10-2021-0036689 | A | | 4/2021 | |
| KR | 20210094859 | A | * | 7/2021 | G09G 3/3233 |
| KR | 10-2024-0006367 | A | | 1/2024 | |
| KR | 10-2024-0020613 | A | | 2/2024 | |

* cited by examiner

*Primary Examiner* — Shaheda A Abdin
(74) *Attorney, Agent, or Firm* — Fenwick & West LLP

(57) ABSTRACT

A level shifter according to an embodiment and a display device including the same are disclosed. The display device includes a display panel including a display panel in which a plurality of pixels are arranged in an area where a plurality of data lines and a plurality of gate lines intersect; a level shifter configured to generate a three-step gate signal and a three-step pseudo signal that are reversed in phase with each other and to supply the three-step gate signal from among the generated signals to a gate line; and a signal wire connecting the level shifter to the gate line.

16 Claims, 16 Drawing Sheets

LEVEL SHIFTER AND DISPLAY DEVICE INCLUDING THE SAME

CROSS-REFERENCE TO RELATED APPLICATION

This application claims priority to and the benefit of Korean Patent Application No. 10-2024-0186643, filed on Dec. 16, 2024, the disclosure of which is incorporated herein by reference in its entirety.

BACKGROUND

Field

The present disclosure relates to a level shifter and a display device comprising the same.

Discussion of Related Art

Electroluminescent display devices are divided into inorganic light emitting display devices and organic light emitting display devices according to a material of a light emitting layer. An active-matrix type organic light emitting display device includes an organic light emitting diode (hereinafter referred to as an "OLED") which emits light by itself, and has advantages in that a response speed is fast and luminous efficiency, luminance, and a viewing angle are large.

In organic light-emitting display devices, organic light-emitting diodes (referred to as "OLEDs") are formed in each of pixels. These organic light-emitting display devices not only respond quickly and have excellent light-emitting efficiency, luminance, and viewing angle, but also have excellent contrast ratio and color reproduction rate because they can express black tones as complete black.

Some of display devices, for example, a liquid crystal display device or an organic light emitting display device includes a display panel including a plurality of sub-pixels, a driver outputting a driving signal for driving the display panel, a power supply generating power to be supplied to the display panel or the driver, and the like. The driver includes a gate driver that supplies a gate signal, such as a scan signal and emission signal to the display panel, and a data driver that supplies a data signal to the display panel.

SUMMARY

Various methods are being developed to reduce electromagnetic interference (EMI) noise in the signal wires of display panel driving circuits. One example of a technique for improving EMI on a signal wire is a field cancellation technique that generates a reverse phase signal of a signal transmitted to the display panel driving circuit.

However, the field cancellation technique has the drawback of requiring additional wires for transmitting the reverse phase signal.

The present disclosure is directed to solving all the above-described necessity and problems.

The present disclosure provides a level shifter and a display device including the same.

It should be noted that objects of the present disclosure are not limited to the above-described objects, and other objects of the present disclosure will be apparent to those skilled in the art from the following descriptions.

A display device according to embodiments of the present disclosure may include a display panel in which a plurality of pixels are arranged in an area where a plurality of data lines and a plurality of gate lines intersect; a level shifter configured to generate a three-step gate signal and a three-step pseudo signal that are reversed in phase with each other and to supply the three-step gate signal from among the generated signals to a gate line; and a signal wire connecting the level shifter to the gate line.

A level shifter according to embodiments of the present disclosure may include a first level shifter configured to receive a first input signal and a second input signal that are sequentially phase-shifted and to generate a three-stage gate signal for output to a gate line; and a second level shifter configured to receive the first and second input signals and to generate a three-step pseudo signal having a reverse phase of the three-step gate signal.

In still another embodiment, a display device comprises a plurality of pixels arranged in at least a first row and a second row, a first group of the pixels of the first row and a second group of the pixels of the second row connected to a shared gate line; and a level shifter configured to generate a gate signal on the shared gate line, the gate signal transitioning between a first voltage level, a second voltage level higher than the first voltage level, and a third voltage level lower than the first voltage level, wherein first driving elements of the first group of the pixels of the first row are connected to corresponding first data lines in response to the second voltage level of the gate signal, and wherein second driving elements of the second group of the pixels of the second row are connected to corresponding second data lines in response to the third voltage level of the gate signal. The first row and the second row may be immediately adjacent to each other with the shared gate line between the first row and the second row. The level shifter may be configured to generate a pseudo gate signal that transitions between the first voltage level, the second voltage level, and the third voltage, in reverse phase from the gate signal, the pseudo gate signal not being provided on the shared gate line. The level shifter may comprise a first level shifter connected to a first input signal and a second input signal and including a first output connected to the shared gate line; and a second level shifter connected to the first input signal and the second input signal and including a second output that is not connected to the shared gate line. The second input signal is sequentially phase-shifted from the first input signal.

The present disclosure generates a three-step gate signal and a three-step pseudo-signal that are reversed in phase to each other, and applies the three-step gate signal through one gate line to sequentially drive switch elements implemented as an n-channel TFT and a p-channel TFT of sub-pixels that are disposed on two adjacent pixel lines and share the gate line, so that data voltage can be sequentially applied to the sub-pixels disposed on the two adjacent pixel lines using the one gate line.

The present disclosure employs one gate line instead of two gate lines, which not only reduces cost but also increases design freedom.

The present disclosure can reduce EMI because it generates a three-step pseudo-signal having a reverse phase relative to the three-step gate signal when the three-step gate signal is generated.

The present disclosure may reduce the number of gate signals generated, which reduces the power consumption and enables low power operation.

The effects of the present specification are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF EXEMPLARY EMBODIMENTS

Figure 1:
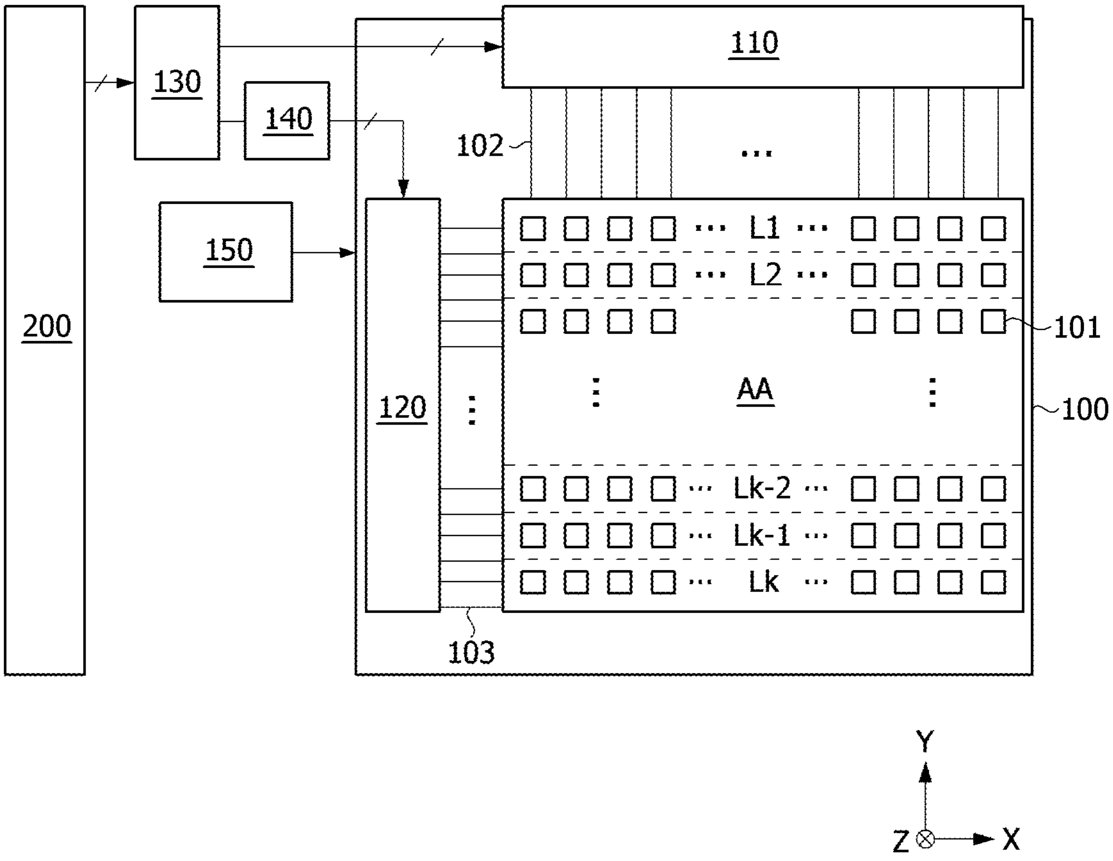
FIG. 1 is a block diagram illustrating a display device according to an embodiment of the present disclosure.

Advantages and features of the present specification and methods of achieving them will become apparent with reference to preferable embodiments, which are described in detail, in conjunction with the accompanying drawings. However, the present specification is not limited to the embodiments to be described below and may be implemented in different forms, the embodiments are only provided to completely disclose the present disclosure and completely convey the scope of the present disclosure to those skilled in the art, and the present specification is defined by the disclosed claims.

Since the shapes, sizes, proportions, angles, numbers, and the like disclosed in the drawings for describing the embodiments of the present disclosure are only exemplary, the present disclosure is not limited to the illustrated items. The same reference numerals indicate the same components throughout the specification. Further, in describing the present disclosure, when it is determined that a detailed description of related known technology may unnecessarily obscure the gist of the present disclosure, the detailed description thereof will be omitted.

When 'including,' 'having,' 'consisting,' and the like mentioned in the present specification are used, other parts may be added unless 'only' is used. A case in which a component is expressed in a singular form includes a plural form unless explicitly stated otherwise.

In interpreting the components, it should be understood that an error range is included even when there is no separate explicit description.

In the case of a description of a positional relationship, for example, when the positional relationship of two parts is described as 'on,' 'at an upper portion,' 'at a lower portion,' 'next to, and the like, one or more other parts may be located between the two parts unless 'immediately' or 'directly' is used.

Although first, second, and the like are used to describe various components, these components are not limited by these terms. These terms are only used to distinguish one component from another. Accordingly, a first component, which is mentioned below, may also be a second component within the technical spirit of the present disclosure.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

FIG. 1 is a block diagram illustrating a display device according to an embodiment of the present disclosure.

Referring to FIG. 1, the display device according to an embodiment of the present disclosure includes a display panel 100, and a display panel driving circuit for writing pixel data to pixels of the display panel 100. Additionally, the display device includes a power supply 150.

The display panel 100 may be, but not limited to, a panel having a rectangular structure with a length in the X-axis direction, a width in the Y-axis direction, and a thickness in the Z-axis direction. For example, the display panel 100 may be a heterogeneous panel of which at least a portion is curved or elliptical.

The display area AA of the display panel 100 includes a pixel array to display an input image. The pixel array includes a plurality of data lines 102, a plurality of gate lines 103 crossing the data lines 102, and pixels arranged in a matrix form. The display panel 100 may further include power lines commonly connected to the pixels. The power lines may be commonly connected to pixel circuits to supply a voltage required for driving pixels 101 to the pixels 101.

Each of the pixels 101 may be divided into a red sub-pixel, a green sub-pixel, and a blue sub-pixel for color implementation. Each pixel may further include a white sub-pixel. Each sub-pixel includes a pixel circuit for driving a light emitting element. The light emitting element may include an OLED or an inorganic light emitting diode (LED). Each pixel circuit is connected to the data lines, the gate lines, and the power lines. In the following description, a pixel may be interpreted as a sub-pixel.

The display area AA includes a plurality of pixel lines L1 to Ln. Each of the pixel lines L1 to Ln includes one line of pixels arranged along the line direction (X-axis direction) in the pixel array of the display panel 100. Those pixels arranged in one pixel line share the gate lines 103. The sub-pixels arranged in the column direction Y along the data line direction share the same data line 102. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on the screen and a real object in the background is visible. The display panel 100 may be made of a flexible display panel.

The power supply 150 receives an input voltage applied from the host system 200 and outputs a voltage needed to drive the pixels 101 of the display panel 100 and the display panel driving circuit. To this end, the power supply 150 may include a direct current to direct current converter (DC-DC converter). The DC-DC converter may include a charge pump, a regulator, a buck converter, a boost converter, and the like. The power supply 150 may output a constant voltage (or direct current voltage), such as gate-on voltage, gate-off voltage, pixel driving voltage, cathode voltage, reference voltage, IC driving voltage of the display panel driving circuit, through the DC-DC converter. The gate-on voltage and the gate-off voltage may be supplied to the level shifter 140 and the gate driver 120. Voltages such as pixel driving voltage, cathode voltage, and reference voltage may be supplied to the pixels 101 through the power lines commonly connected to the pixels 101.

The power supply 150 may further include a gamma voltage generator. The gamma voltage generator receives a high-potential reference voltage and a low-potential reference voltage and outputs a plurality of gamma reference voltages divided at specific intervals on a preset gamma curve, for example, a 2.2 gamma curve. The gamma reference voltages are supplied to the data driver 110. In the data driver 110, the gamma reference voltages are subdivided by a voltage dividing circuit into grayscale voltages.

The display panel driving circuit writes pixel data of the input image to the pixels 101 of the display panel 100 under the control of the timing controller 130. The display panel driving circuit includes a data driver 110 and a gate driver 120.

The display panel driving circuit may further include a touch sensor driver for driving touch sensors. The touch sensor driver is not shown in FIG. 1. The data driver 110 and the touch sensor driver may be integrated into one source drive IC.

The data driver 110 receives pixel data of the input image as a digital signal from the timing controller 130 and outputs a data voltage. The data driver 110 may receive gamma reference voltages and generate gamma compensation voltages for each grayscale through a voltage dividing circuit. The per-grayscale gamma compensation voltages are supplied to a digital to analog converter (hereinafter referred to as "DAC") disposed in each channel of the data driver 110.

The data driver 110 samples and latches digital data received from the timing controller 130 and then inputs the digital data to the DAC. Here, the digital data includes pixel data of the input image. Additionally, the digital data may include mode selection data for selecting first mode and second mode. The DAC converts the pixel data into a gamma compensation voltage and outputs a data voltage of the pixel data.

The gate driver 120 may be formed on the display panel 100 together with the circuit elements and wiring lines of the display area AA. The gate driver 120 may be disposed in at least one of left and right non-display areas NA outside the display area AA in the display panel 100 or at least a part thereof may be disposed within the display area AA.

The gate driver 120 sequentially outputs pulses of the gate signals to the gate lines 103 under the control of the timing controller 130. The gate driver 120 may sequentially supply the gate signals to the gate lines 103 by shifting the pulses of the gate signals.

The timing controller 130 receives digital video data of an input image and a timing signal synchronized with this data from the host system 200. The timing signal may include a vertical synchronization signal Vsync, a horizontal synchronization signal Hsync, and a data enable signal DE. Since the vertical period and horizontal period may be known by counting the data enable signal DE, the vertical synchronization signal Vsync and the horizontal synchronization signal Hsync may be omitted. The horizontal synchronization signal Hsync and the data enable signal DE have a periodicity of 1 horizontal period (1H).

The timing controller 130 may control the display panel driving circuit by generating a data timing control signal for controlling the operation timing of the data driver 110 and a gate timing control signal for controlling the operation timing of the gate driver 120 based on the timing signals Vsync, Hsync, DE received from the host system 200. The timing controller 130 may synchronize the data driver 110 and the gate driver 120 by controlling the operation timing of the display panel driving circuit.

The gate timing control signal output from the timing controller 130 may be input to the shift register of the gate driver 120 through the level shifter 140. The level shifter 140 may convert a voltage of the gate timing control signal received from the timing controller 130 to a swing width between the gate-on voltage and the gate-off voltage and supply it to the gate driver 120.

The level shifter 140 may convert an input signal received from the timing controller 130 into a three-step voltage and output a three-step signal. The three-step signal is a signal that includes a reference level, a high-level voltage above the reference level, and a low-level voltage below the reference level.

The host system 200 may include a main board of one of a television system, a set-top box, a navigation system, a personal computer (PC), a vehicle system, a mobile terminal, and a wearable terminal. The host system 200 may scale an image signal from a video source according to the resolution of the display panel 100, and may transmit it to the timing controller 130 together with the timing signals.

Figure 2:
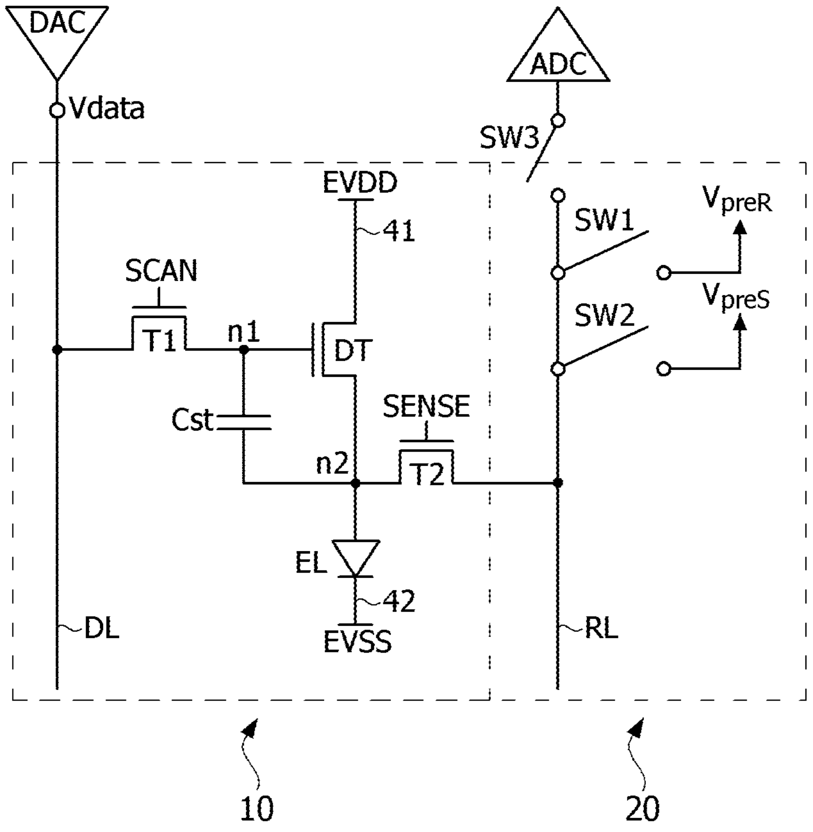
FIG. 2 is a diagram for explaining a pixel shown in FIG. 1.

FIG. 2 is a diagram for explaining a pixel shown in FIG. 1.

Referring to FIG. 2, a pixel circuit 10 according to an embodiment of the present disclosure may include a light-emitting element EL, a driving element DT, a first switch element T1, a second switch element T2, and a capacitor Cst. The driving element DT and the switch elements T1 to T2 may be implemented as, but are not limited to, n-channel TFT.

The light-emitting element EL emits light by current that is applied through a channel of the driving element DT according to the gate-source voltage Vgs of the driving element DT that is changed according to a data voltage Vdata. The light-emitting element EL may be implemented as an OLED including an organic compound layer formed between an anode and a cathode. The organic compound layer may include a hole injection layer HIL, a hole transport layer HTL, a light emission layer EML, an electron transport layer ETL, and an electron injection layer EIL, but is not limited thereto. The anode of the light-emitting element EL is connected to the driving element DT through a second node n2, and the cathode of the light-emitting element EL is connected to a low-potential power voltage line 42 to which a low-potential power voltage EVSS is applied.

The OLED that is used as the light-emitting element EL may be a tandem structure in which a plurality of light emission layers are stacked. The OLED of the tandem structure can improve the luminance and lifetime of pixels.

The driving element DT drives the light-emitting element EL by supplying current to the light-emitting element EL according to a gate-source voltage Vgs. The driving element DT includes a gate electrode connected to a first node n1, a first electrode (or drain electrode) connected to a first power line 41 to which a pixel driving voltage EVDD is applied, and a second electrode (or source electrode) connected to a second node n2.

The first switch element T1 is turned on according to the gate-on voltage VGH of a first gate signal, i.e., a scan signal SCAN, and connects the data line DL to the first node n1 to apply a data voltage Vdata. The first switch element T1 includes a gate electrode to which the scan signal SCAN is applied, a first electrode connected to the data line DL to which the data voltage Vdata is applied, and a second electrode connected to the first node n1.

Here, the first switch element T1 may be implemented as an n-channel TFT or a p-channel TFT depending on the arrangement position of the pixel. For example, among two adjacent pixels sharing one gate line, one is implemented as an n-channel TFT and the other is implemented as a p-channel TFT.

The second switch element T2 is turned on according to the gate-on voltage VGH of a second gate signal, i.e., a sensing signal SENSE, and connects the reference voltage line RL to the second node n2 to apply a reference voltage VpreR or VpreS. The second switch element T2 includes a gate electrode to which the sensing signal SENSE is applied, a first electrode connected to the second node n2, and a second electrode connected to the reference voltage line RL to which the reference voltage is applied.

The capacitor Cst is connected between the first node n1 and the second node n2. The capacitor Cst may charge the gate-source voltage Vgs of the driving element DT.

The sensing circuit 20 for sensing electrical characteristics of the pixel circuit 10 may be disposed in the data driver and may include a first switch SW1, a second switch SW2, and a third switch SW3.

The first switch SW1 turns on during display mode driving for displaying images and supplies the reference voltage VpreR for displaying to the reference voltage line RL. The reference voltage VpreR for displaying is applied to the second node n2 through the second switch element T2.

The second switch SW2 is turned on during sensing mode driving for sensing the electrical characteristics of the pixel circuit, i.e., the current flowing through the driving element DT or the voltage between the driving element DT and the light-emitting element EL, and supplies the reference voltage VpreS for sensing to the reference voltage line RL. The reference voltage VpreS for sensing is applied to the second node n2 through the second switch element T2.

The third switch SW3 is turned on during the sensing mode driving and connects the reference voltage line RL to an analog-to-digital converter ADC.

The ADC senses the current flowing through the driving element DT or the voltage between the driving element DT and the light-emitting element EL and converts it into sensing data that is a digital value. Here, the sensing data includes threshold voltage or mobility information of the driving element.

The sensing mode may be formed in vertical blank periods between vertical active periods. The sensing mode includes a sensing period and a sampling period. The second switch SW2 is turned on during the sensing period, and the third switch SW3 is turned on during the sampling period after the sensing period.

The DAC converts the image data corrected by the sensing data into the data voltage Vdata and outputs it. The DAC supplies the data voltage Vdata for sensing to the data lines DL during the sensing mode.

Figure 3:
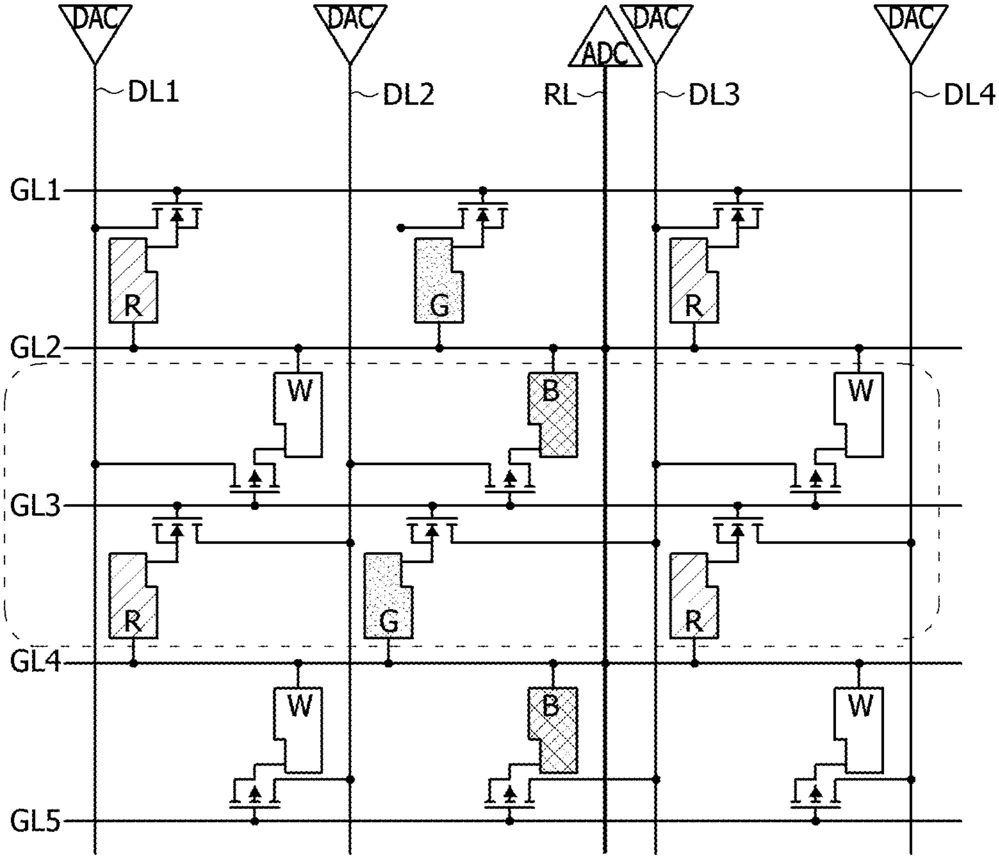
FIGS. 3 and 4 are diagrams for explaining a pixel arrangement form shown in FIG. 1.
Figure 4:
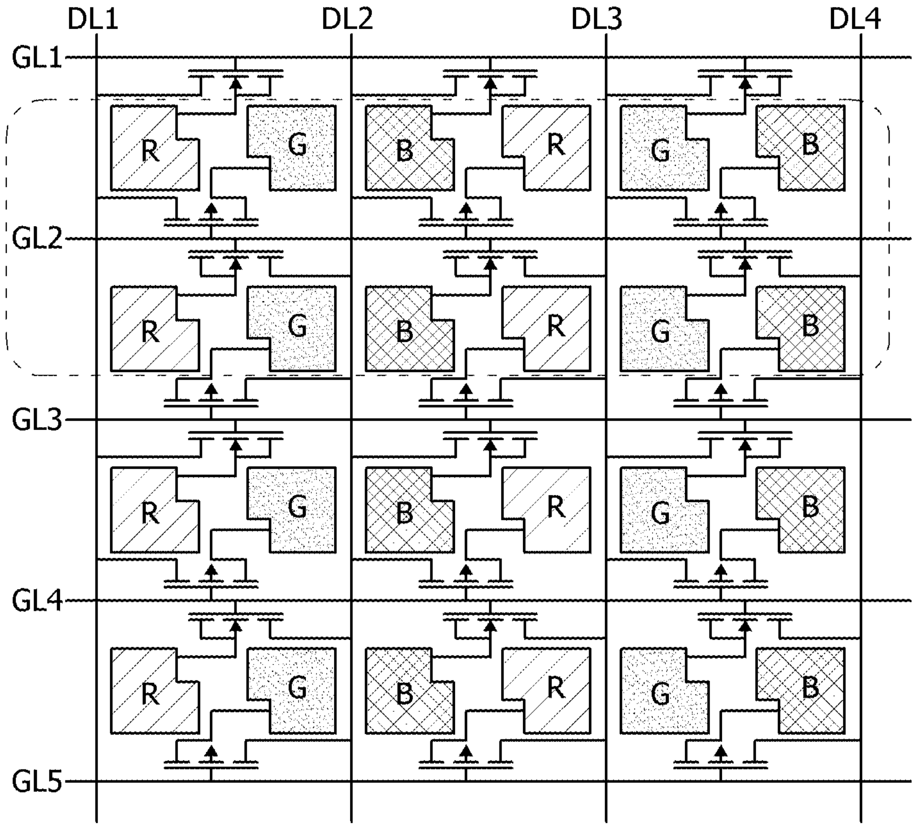

FIGS. 3 and 4 are diagrams for explaining a pixel arrangement form shown in FIG. 1 and FIGS. 5 to 9 are diagrams for explaining the driving principle of the pixels shown in FIG. 4.

Here, the pixels illustrated in FIG. 3 may be used in an organic light-emitting display device, and the pixels illustrated in FIG. 4 may be used in a liquid crystal display device, but are not limited thereto.

Referring to FIGS. 3 and 4, in the embodiments of the present disclosure, sub-pixels disposed on adjacent pixel lines or pixel rows may share a gate line, and sub-pixels disposed on adjacent pixel rows may be driven sequentially by gate signals applied from the gate lines.

In an example, in FIG. 3, red sub-pixels R and white sub-pixels W disposed in adjacent pixel rows share one gate line GL3, and green sub-pixels G and blue sub-pixels B share one gate line GL3.

In another example, in FIG. 4, red sub-pixels R and green sub-pixels G disposed in adjacent pixel rows share one gate line GL2, and blue sub-pixels B and red sub-pixels R share one gate line GL2.

Referring to FIGS. 5 to 9, sub-pixels disposed in adjacent pixel rows may share one gate line. Sub-pixels disposed in adjacent pixel rows may be driven sequentially through one gate line that they share.

With respect to a gate line GL, the switch elements of the sub-pixels connected on one side (e.g., the sub-pixels of the (k)th pixel row Lk (where k is a natural number) are implemented as a p-channel TFT, and the switch elements of the sub-pixels connected on the other side (e.g., the sub-pixels of (k+1)th pixel row Lk+1) are implemented as an n-channel TFT. For example, with respect to the gate line GL, the red sub-pixels R and the green sub-pixels G include switch elements of an n-channel TFT, and the white sub-pixels W and the blue sub-pixels B include switch elements of a p-channel TFT. Therefore, the p-channel TFT is turned on by a three-step gate signal or scan signal applied to the gate line GL, and then the n-channel TFT is turned on.

Figure 5:
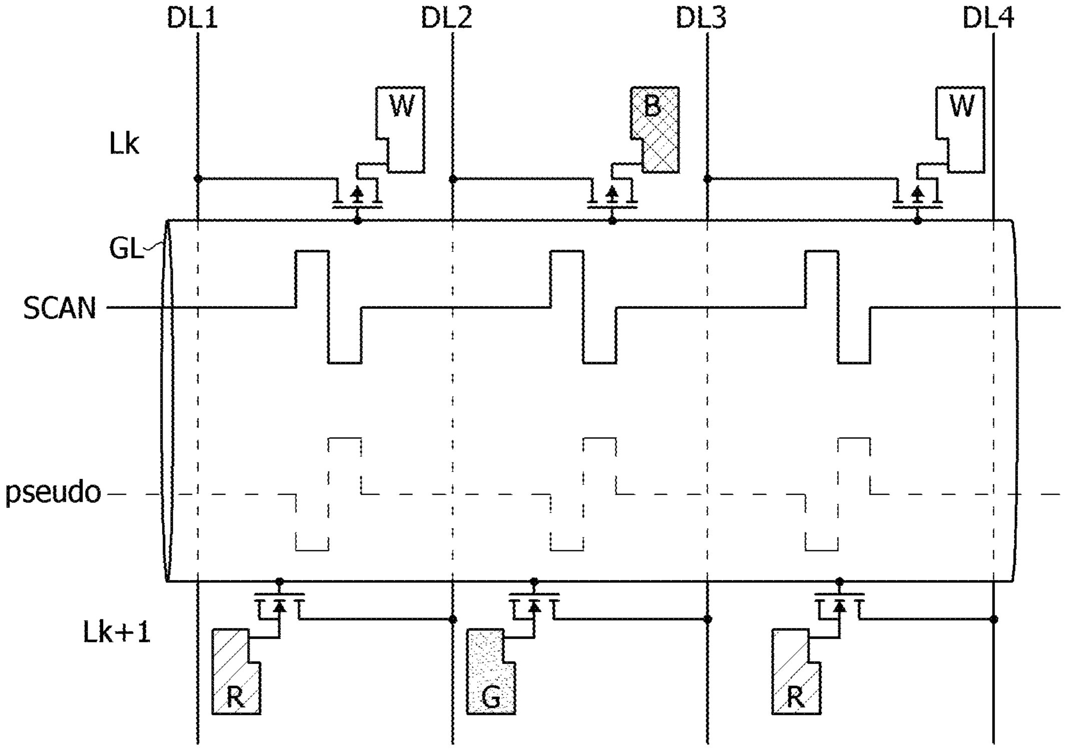
FIGS. 5 to 9 are diagrams for explaining the driving principle of the pixels shown in FIG. 4.
Figure 6:
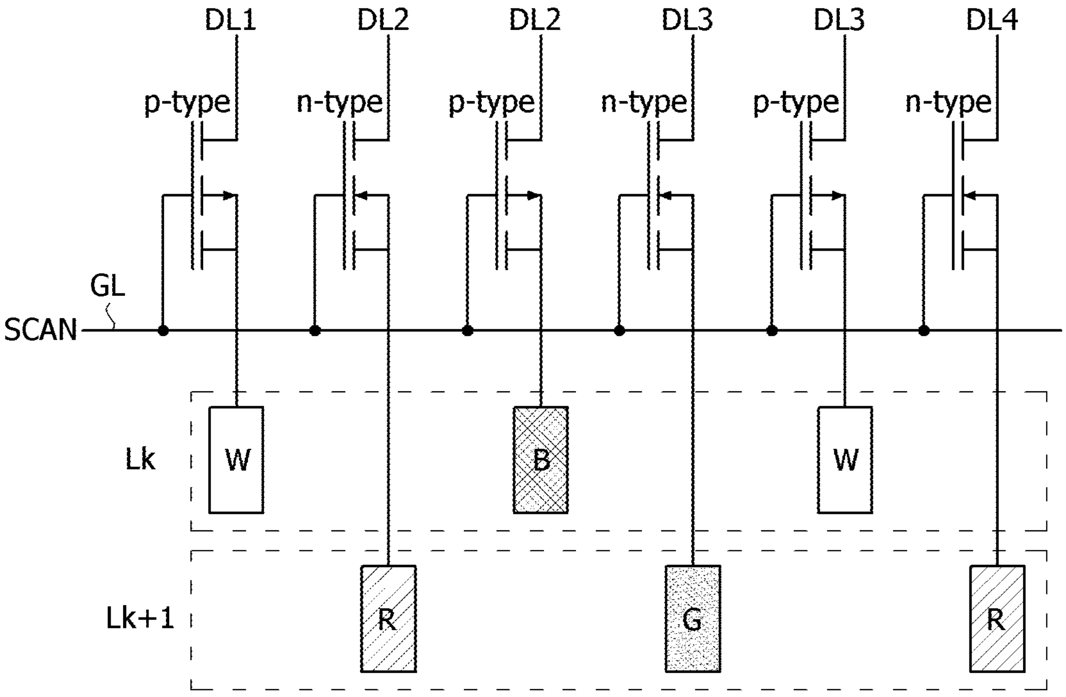

In an example, when a three-step scan signal is applied to the gate line in FIGS. 5 and 6, which show an enlarged view of the dotted portion of FIG. 3, the n-channel TFTs of the sub-pixels on the (k+1)th pixel row Lk+1 (e.g., the n-channel TFTs of the red sub-pixels R) are turned on, and then the p-channel TFTs of the sub-pixels on the (k)th pixel row Lk (e.g., the p-channel TFTs of the white sub-pixels W) are turned on.

Figure 8:
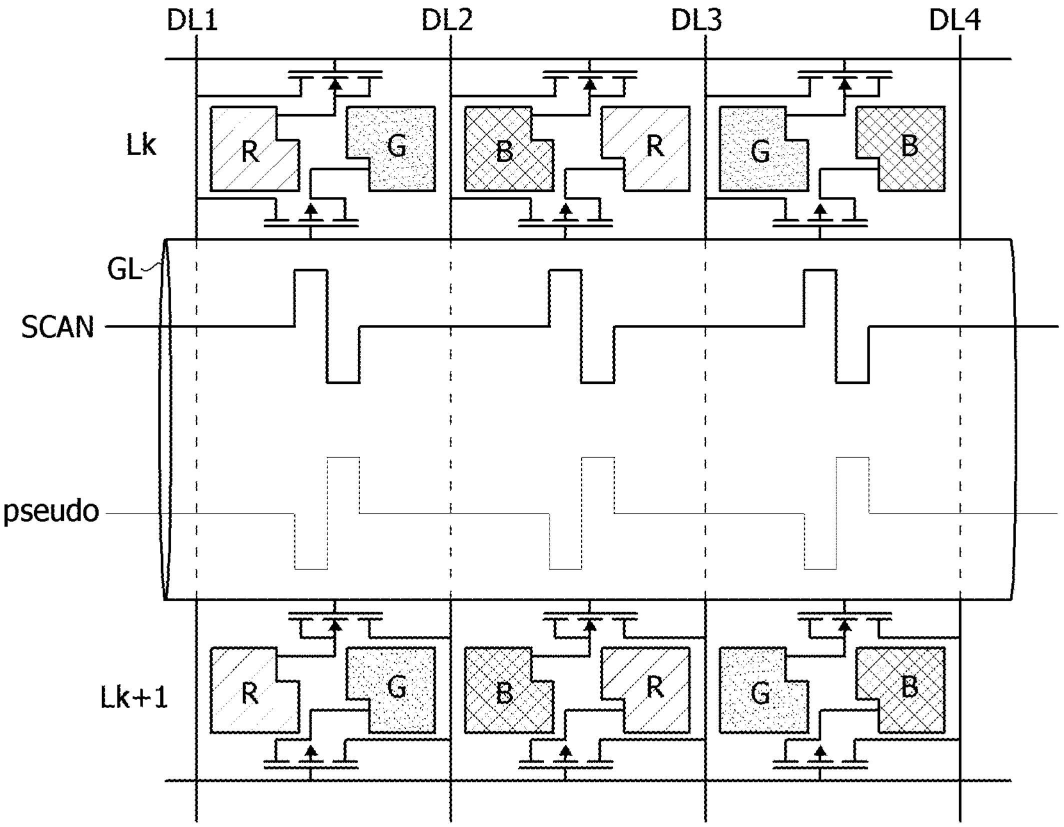
Figure 9:
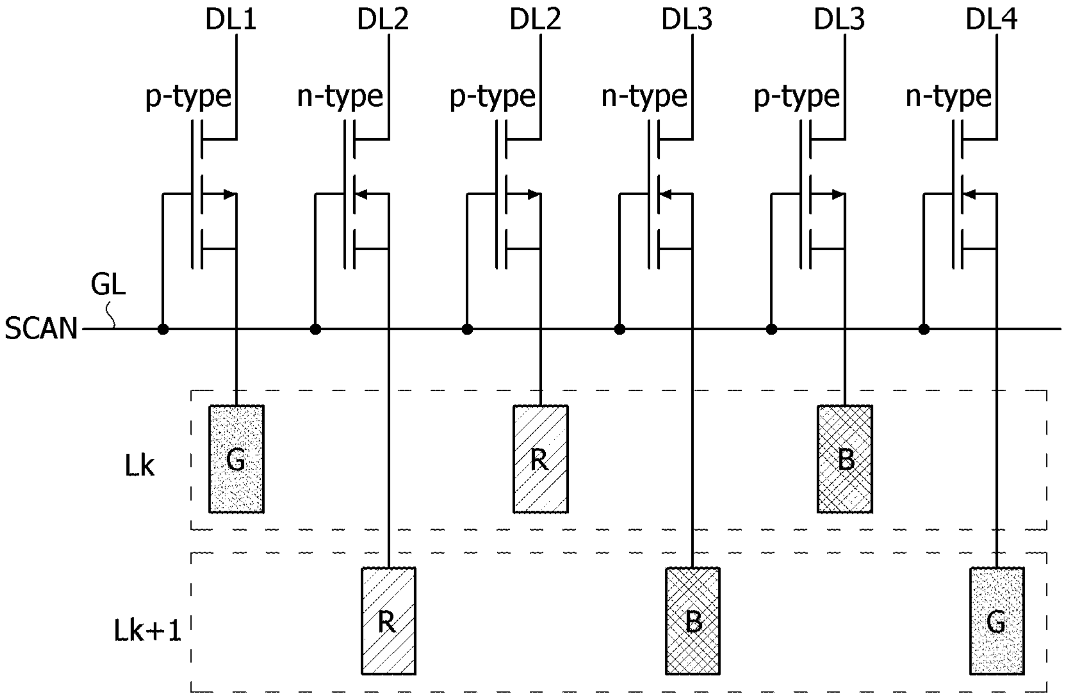

In another example, when a three-step scan signal is applied to the gate line in FIGS. 8 and 9, which show an enlarged dotted portion of FIG. 4, the n-channel TFTs of the sub-pixels of the (k+1)th pixel row Lk+1 (e.g., the n-channel TFTs of the red sub-pixels R) are turned on, and then the p-channel TFTs of the sub-pixels of the (k)th pixel row Lk (e.g., the p-channel TFTs of the green sub-pixels G) are turned on.

That is, the switch element of each of the sub-pixels on the (k)th pixel row Lk may include a different type of TFT than the switch element of each of the sub-pixels on the (k+1)th pixel row Lk+1 adjacent to the (k)th pixel row, and may be connected to the (i)th gate line (where i is a natural number).

Here, a three-step scan signal is applied to the gate line GL, but a three-step pseudo signal with inverted phase is not applied. The three-step pseudo-signal with inverted phase may be generated but not applied to the gate line GL, but may cancel out EMI.

Figure 7:
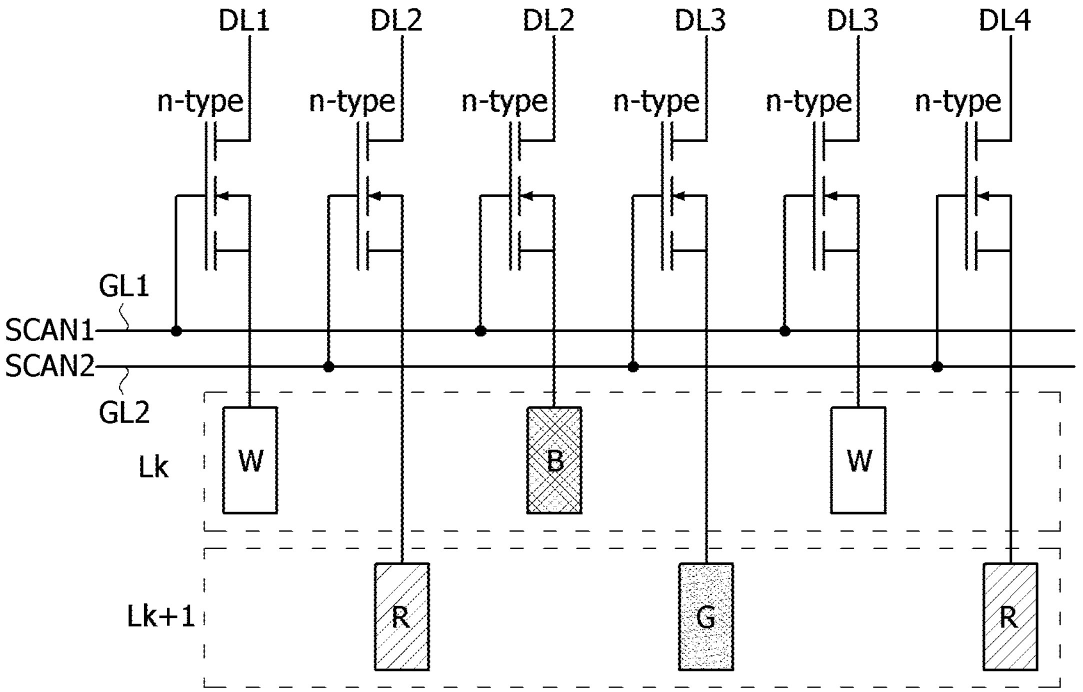

Meanwhile, in a comparative example in FIG. 7, where the switch elements of all sub-pixels are implemented as n-channel TFT, different scan signals must be applied through two gate lines GL1 and GL2. In other words, a first scan signal SCAN1 is applied through a first gate line GL1 to turn on the n-channel TFTs of the white sub-pixels W, and then a second scan signal SCAN2 is applied through a second gate line GL2 to turn on the n-channel TFTs of the red sub-pixels R.

As described, the comparative example applies different scan signals through two gate lines to sequentially drive the switch elements of the sub-pixels connected to each gate line, whereas the present embodiment may utilize a three-step scan signal applied through one gate line to sequentially drive the switch elements of the sub-pixels sharing the one gate line. For example, an embodiment of the present disclosure may utilize a three-step scan signal applied through one gate line to sequentially drive the switch elements of sub-pixels of a plurality of pixel rows.

Figure 10:
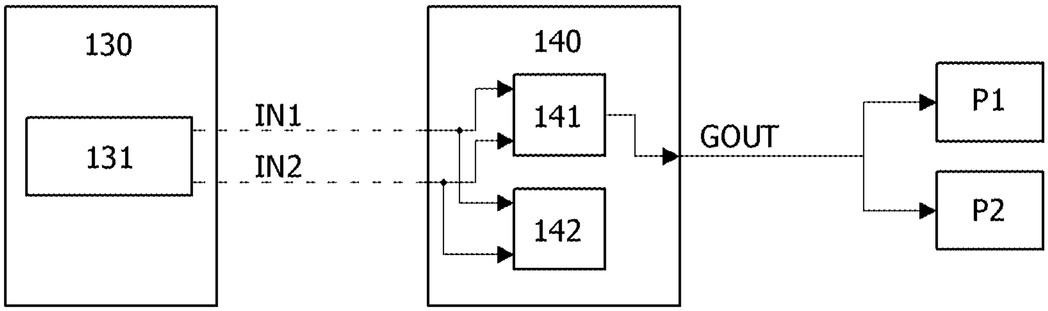
FIG. 10 is a diagram for explaining the operation of a timing controller and a level shifter.
Figure 11:
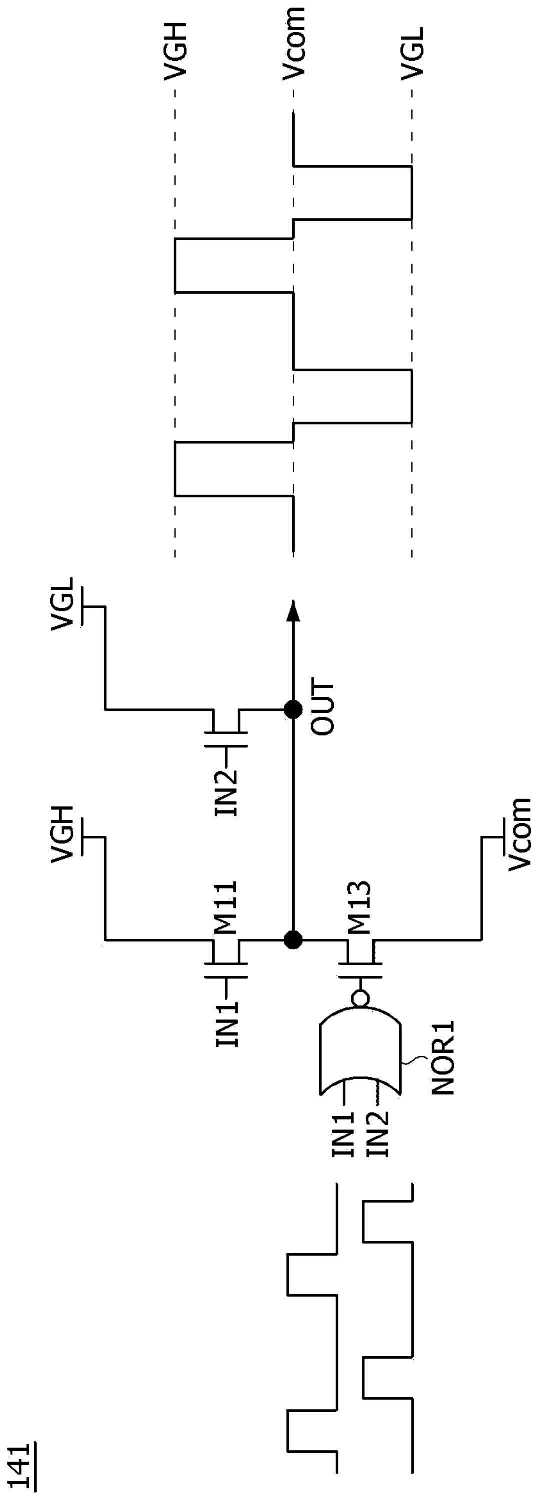
FIG. 11 is a diagram illustrating a first level shifter shown in FIG. 10.
Figure 12:
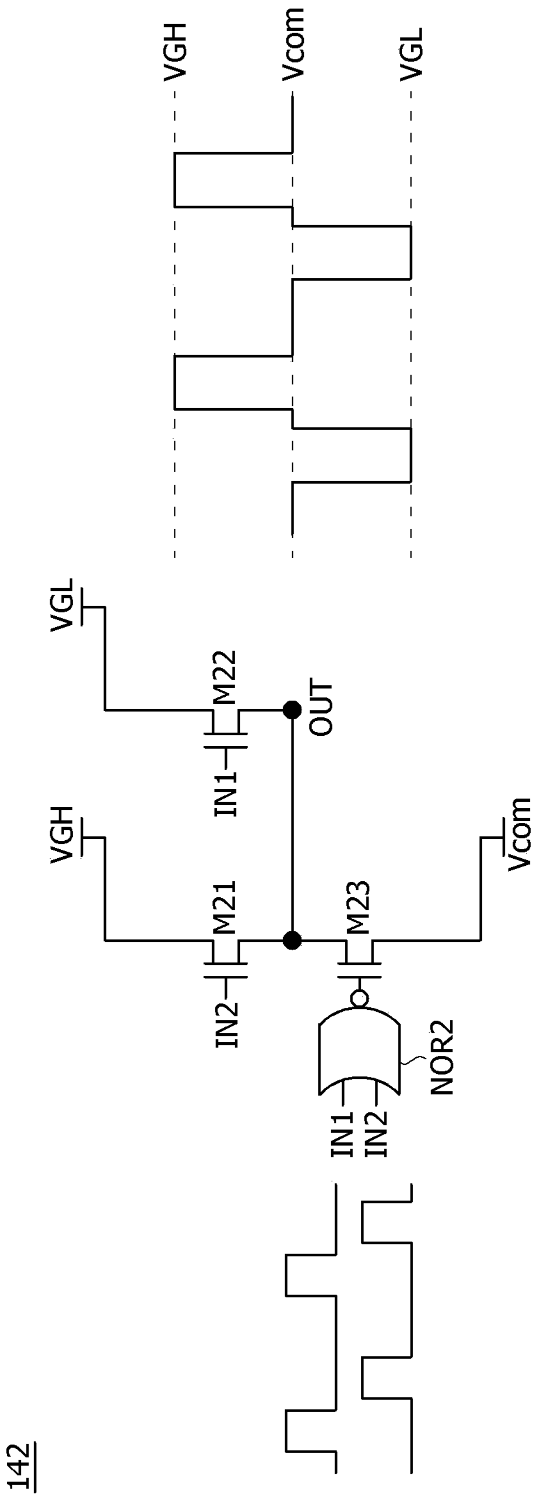
FIG. 12 is a diagram illustrating a second level shifter shown in FIG. 10.

FIG. 10 is a diagram for explaining the operation of a timing controller and a level shifter, FIG. 11 is a diagram illustrating a first level shifter shown in FIG. 10 and FIG. 12 is a diagram illustrating a second level shifter shown in FIG. 10.

Referring to FIG. 10, the timing controller 130 according to an embodiment of the present disclosure includes a signal generator 131, wherein the signal generator 131 may generate a first input signal IN1 and a second input signal IN2 in the form of pulses that are sequentially phase-shifted.

The signal generator 131 may sequentially output pulses of the first input signal IN1 and the second input signal IN2 using a shift register. The first and second input signals IN1 and IN2 may be output as two-step pulses with transistor-transistor logic (TTL) voltage levels between 0 V and 3.3 V.

The level shifter 140 may receive the two-step signal provided from the signal generator 131 and output the three-step signal. The level shifter 140 may output a three-step gate signal GOUT to sub-pixels P1 and P2 on adjacent pixel rows that share one gate line by using the first and second input signals IN1 and IN2. The three-step gate signal GOUT may be generated with a voltage greater than the voltages of the first and second input signals IN1 and IN2.

The level shifter 140 may include a first level shifter 141 and a second level shifter 142.

Referring to FIG. 11, the first level shifter 141 according to an embodiment includes an eleventh switch element M11, a twelfth switch element M12, a first NOR gate NOR1, and a thirteenth switch element M13.

The eleventh switch element M11 is turned on according to the first input signal IN1 to output a gate-high voltage VGH. The eleventh switch element M11 includes a gate electrode to which the first input signal IN1 is applied, a first electrode to which the gate-high voltage VGH is applied, and a second electrode connected to an output node OUT.

The twelfth switch element M12 is turned on according to the second input signal IN2 to output the gate-low voltage VGL. The twelfth switch element M12 includes a gate electrode to which the second input signal IN2 is applied, a first electrode to which the gate-low voltage VGL is applied, and a second electrode connected to the output node OUT.

The first NOR gate NOR1 outputs a high voltage when both the first input signal IN1 and the second input signal IN2 are at low voltage, and outputs a low voltage when at least one of the input signals is high voltage.

The thirteen switch element M13 is turned on when an output of the first NOR gate NOR1 is at a high voltage to output a common voltage Vcom to the output node OUT. The thirteen switch element M13 includes a gate electrode to which the output of the first NOR gate NOR1 is applied, a first electrode connected to the output node OUT, and a second electrode to which the common voltage Vcom is applied.

In this configuration, the output node OUT may be connected to the gate line through a signal wire.

The first level shifter 141 may generate the three-stage gate signal GOUT and supply the generated three-stage gate signal GOUT to the pixel circuit through the gate line.

Referring to FIG. 12, the second level shifter 141 according to an embodiment includes a twenty first switch element M21, a twenty second switch element M22, a second NOR gate NOR2, and a twenty third switch element M23.

The twenty first switch element M21 is turned on according to the second input signal IN2 to output a gate-high voltage VGH. The twenty first switch element M21 includes a gate electrode to which the second input signal IN2 is applied, a first electrode to which the gate-high voltage VGH is applied, and a second electrode connected to the output node OUT.

The twenty second switch element M22 is turned on according to the first input signal IN1 to output the gate-low voltage VGL. The twenty second switch element M22 includes a gate electrode to which the first input signal IN1 is applied, a first electrode to which the gate-low voltage VGL is applied, and a second electrode connected to the output node OUT.

The second NOR gate NOR2 outputs a high voltage when both the first input signal IN1 and the second input signal IN2 are at low voltage, and outputs a low voltage when at least one of the input signals is at a high voltage.

The twenty third switch element M23 is turned on when the output of the second NOR gate NOR2 is at a high voltage to output the common voltage Vcom to the output node OUT. The twenty third switch element M23 includes a gate electrode to which the output of the second NOR gate NOR2 is applied, a first electrode connected to the output node OUT, and a second electrode to which the common voltage Vcom is applied.

In this configuration, the output node OUT is not connected to the gate line.

The second level shifter 142 generates the three-step pseudo signal that is inverted with respect to the gate signal GOUT supplied to the gate line, and does not output the generated three-step pseudo signal to the display area in which sub-pixels are disposed. Merely generating the three-step pseudo signal with inverted phase cancels out EMI caused by the three-step scan signal.

Figure 13:
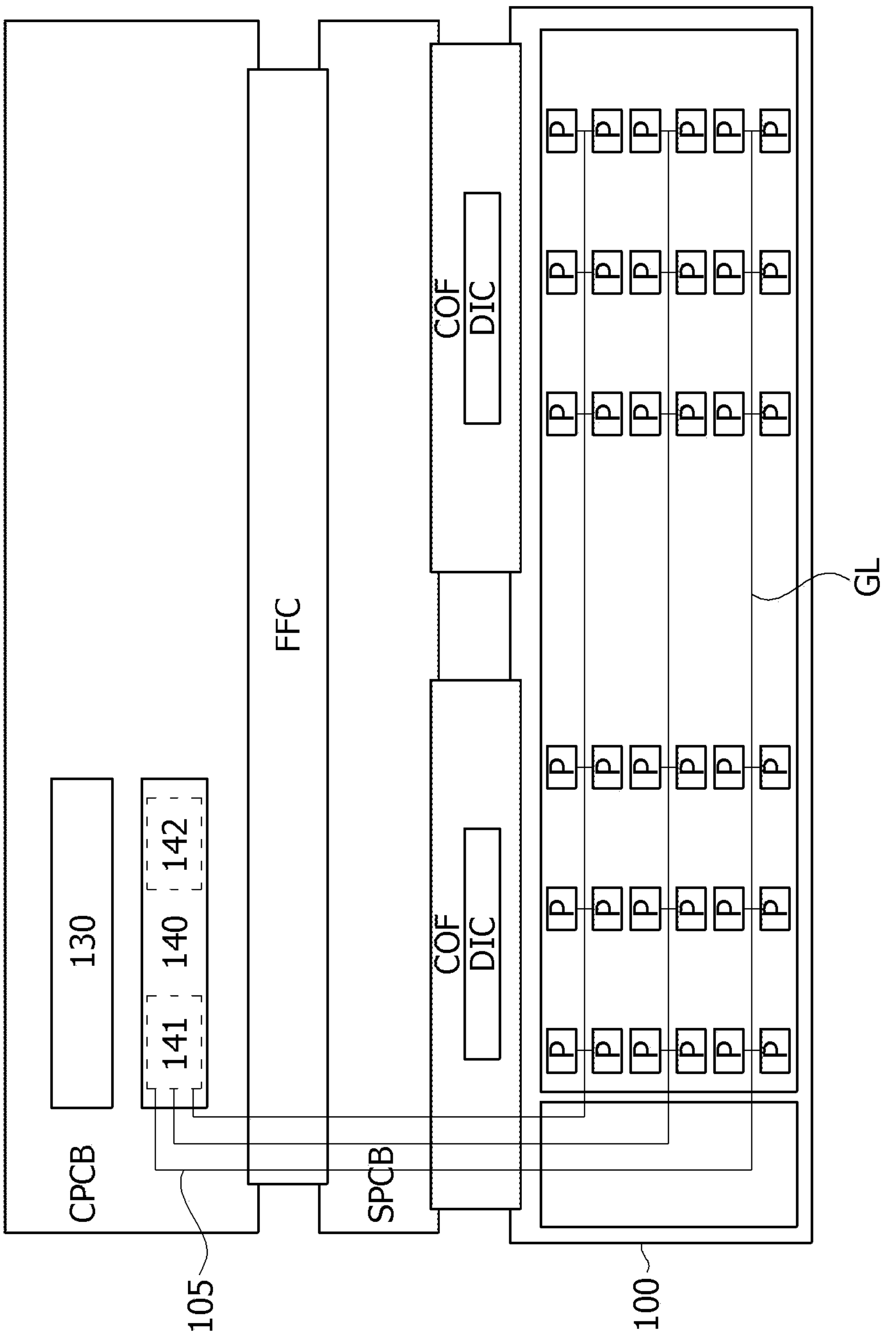
FIG. 13 is a diagram for explaining an arrangement form of signal wires that transmit scan signals.

FIG. 13 is a diagram for explaining an arrangement form of signal wires that transmit scan signals.

Referring to FIG. 13, the first level shifter 141 according to an embodiment may include signal wires 105 for transmitting the generated scan signals to the gate lines. A plurality of signal wires 105 may connect the output node of the first level shifter 141 to the gate line GL.

The timing controller and the level shifter may be disposed on a control printed circuit board CPCB. A chip on film (COF) may be adhered to a display panel 100. The COF includes a drive IC DIC and connects a source PCB SPCB to the display panel 100. The drive IC DIC includes a data driver. The control PCB CPCB may be connected to the source PCB SPCB through a flexible flat cable FFC.

These plurality of signal wires 105 may be arranged side by side in a non-displayed area on the left or right side of the display panel. Because the plurality of signal wires 105 are arranged to bypass the non-display area in which the circuits of the gate driver are disposed, some of the signal wires 105 may overlap the circuits of the gate driver with an insulating layer therebetween.

Figure 14:
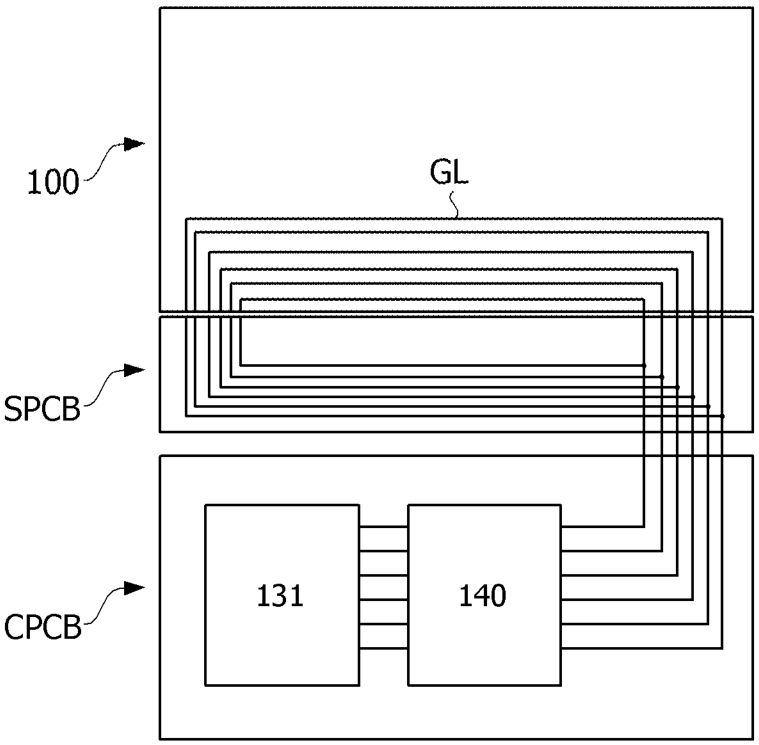
FIGS. 14 to 16 are diagrams for comparing and explaining the performance between a comparative example and the present embodiment.
Figure 15:
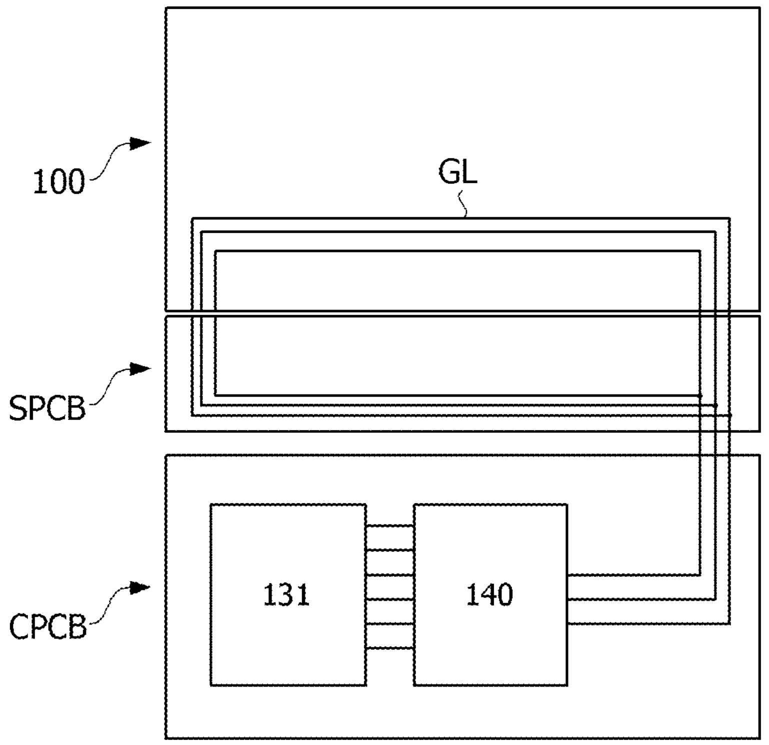
Figure 16:
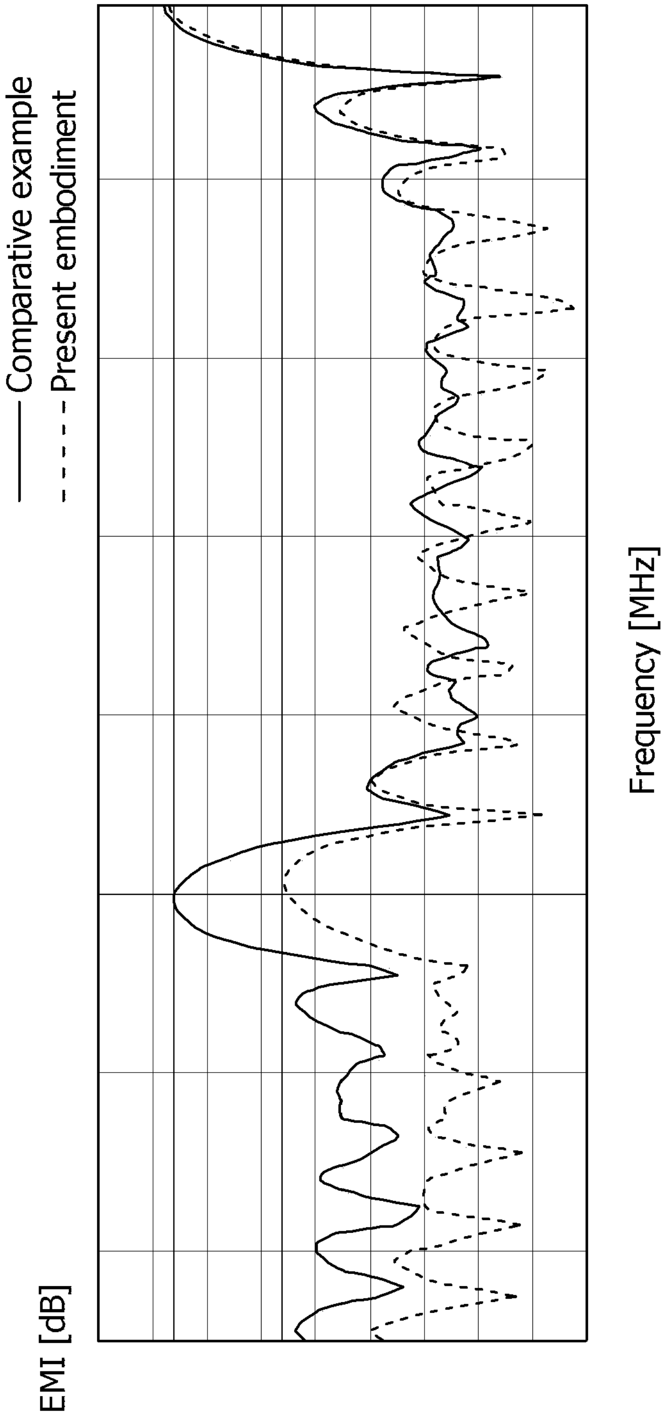

FIGS. 14 to 16 are diagrams for comparing and explaining the performance between a comparative example and the present embodiment.

In the comparative example of FIG. 14, as shown in FIG. 7, since the switch elements of sub-pixels arranged in adjacent pixel rows Lk, Lk+1 are all implemented as an n-channel TFT, the switch elements may be supplied with the data voltages only when the scan signals are sequentially applied using different gate lines GL.

In the embodiment of FIG. 15, as shown in FIG. 6, since the switch elements of sub-pixels arranged in adjacent pixel rows Lk, Lk+1 are implemented as n-channel TFT and p-channel TFT, the switch elements may be supplied with data voltages by applying the three-step scan signal using one gate line GL.

For example, the comparative example of FIG. 14 requires two gate lines GL to apply a scan signal to two pixel rows Lk, Lk+1, while the embodiment of FIG. 15 requires only one gate line GL for two pixel rows Lk, Lk+1. In this way, the present embodiment may reduce the number of gate lines and reduce the number of gate signals by the reduced number of gate lines, thereby improving EMI noise.

Referring to FIG. 16, the EMI generated in the driving circuits of the comparative example and the present embodiment in the AM band (526 kHz to 1.6 MHz) is shown. As can be seen, the present embodiment has reduced EMI noise.

Specifically, the EMI in the present embodiment is reduced by about 5 dB in the 1 MHz band compared to the comparative example, and the EMI noise is reduced across the entire AM band.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A display device comprises: a display panel in which a plurality of pixels are arranged in an area where a plurality of data lines and a plurality of gate lines intersect; a level shifter configured to generate a three-step gate signal and a three-step pseudo signal that are reversed in phase with each other and to supply the three-step gate signal to a gate line; and a signal wire connecting the level shifter to the gate line; wherein the level shifter includes: a first level shifter configured to receive a first input signal and a second input signal that is sequentially phase-shifted from the first input signal and to generate the three-step gate signal for output; and a second level shifter configured to receive the first and second input signals to generate the three-step pseudo-signal; and wherein: the first level shifter includes an eleventh switch element, a twelfth switch element, a first NOR gate, and a thirteen switch element, the eleventh switch element includes a gate electrode to which the first input signal is applied, a first electrode to which a gate-high voltage is applied, and a second electrode connected to an output node of the first level shifter, the twelfth switch element includes a gate electrode to which the second input signal is applied, a first electrode to which a gate-low voltage is applied, and a second electrode connected to the output node of the first level shifter, the first NOR gate is configured to receive the first input signal and the second input signal and outputs a high voltage or a low voltage in response thereto, the thirteen switch element includes a gate electrode to which an output of the first NOR gate is applied, a first electrode connected to the output node, and a second electrode to which a common voltage is applied, and the output node of the first level shifter is connected to the gate line through the signal wire.

2. The display device of claim 1, wherein the level shifter is configured to generate the three-step pseudo-signal, but not supply it the gate line.

3. The display device of claim 1, wherein: the second level shifter includes a twenty first switch element, a twenty second switch element, a second NOR gate, and a twenty third switch element, the twenty first switch element includes a gate electrode to which the second input signal is applied, a first electrode to which a gate-high voltage is applied, and a second electrode connected to an output node of the second level shifter, the twenty second switch element includes a gate electrode to which the first input signal is applied, a first electrode to which a gate-low voltage is applied, and a second electrode connected to the output node of the second level shifter, the second NOR gate is configuration receive the first input signal and the second input signal and outputs a high voltage or a low voltage in response thereto, the twenty third switch element includes a gate electrode to which an output of the second NOR gate is applied, a first electrode connected to the output node, and a second electrode to which a common voltage is applied, the output node of the second level shifter is not connected to the gate line.

4. The display device of claim 1, further comprising: a signal generator configured to generate the first and second input signals.

5. The display device of claim 1, wherein the pixels includes: a light-emitting element; a driving element configured to drive the light-emitting element; a capacitor connected between a gate electrode and a source electrode of the driving element; a first switch element configured to apply a data voltage by connecting a data line to the gate electrode of the driving element in response to a first gate signal applied to the gate lines; and a second switch element configured to apply a reference voltage by connecting a reference voltage line to the source node of the driving element in response to a second gate signal.

6. The display device of claim 5, wherein the first gate signal includes the three-step gate signal.

7. The display device of claim 5, wherein a first switch element of each of the pixels on a (k)th pixel row (where k is a natural number) is a different type of TFT from a first switch element of each of the pixels on a (k+1)th pixel row adjacent to the (k)th pixel row.

8. The display device of claim 7, wherein the first switch elements of the (k)th pixel row and the first switch elements on the (k+1)th pixel row are connected to a same (i)th gate line, where i is a natural number.

9. A level shifter comprising: a first level shifter configured to receive a first input signal and a second input signal that is sequentially phase-shifted from the first input signal and to generate a three-stage gate signal for output to a gate line; and a second level shifter configured to receive the first and second input signals and to generate a three-step pseudo signal having a reverse phase of the three-step gate signal;

wherein: the first level shifter includes an eleventh switch element, a twelfth switch element, a first NOR gate, and a thirteen switch element, the eleventh switch element includes a gate electrode to which the first input signal is applied, a first electrode to which a gate-high voltage is applied, and a second electrode connected to an output node of the first level shifter, the twelfth switch element includes a gate electrode to which the second input signal is applied, a first electrode to which a gate-low voltage is applied, and a second electrode connected to the output node of the first level shifter, the first NOR gate is configured to receive the first input signal and the second input signal and outputs a high voltage or a low voltage in response thereto, the thirteen switch element includes a gate electrode to which an output of the first NOR gate is applied, a first electrode connected to the output node, and a second electrode to which a common voltage is applied, and the output node of the first level shifter is connected to the gate lines.

10. The level shifter of claim 9, wherein the second level shifter does not output the three-step pseudo signal to the gate line.

11. The level shifter of claim 9, wherein: the second level shifter includes a twenty first switch element, a twenty second switch element, a second NOR gate, and a third switch element, the twenty first switch element includes a gate electrode to which the second input signal is applied, a first electrode to which a gate-high voltage is applied, and a second electrode connected to an output node of the second level shifter, the twenty second switch element includes a gate electrode to which the first input signal is applied, a first electrode to which a gate-low voltage is applied, and a second electrode connected to the output node of the second level shifter, the second NOR gate is configuration receive the first input signal and the second input signal and outputs a high voltage or a low voltage in response thereto, the twenty third switch element includes a gate electrode to which an output of the second NOR gate is applied, a first electrode connected to the output node, and a second electrode to which a common voltage is applied, and the output node of the second level shifter is not connected to the gate line.

12. A display device comprising:

a plurality of pixels arranged in at least a first row and a second row, a first group of the pixels of the first row and a second group of the pixels of the second row connected to a shared gate line; and a level shifter configured to generate a gate signal on the shared gate line, the gate signal transitioning between a first voltage level, a second voltage level higher than the first voltage level, and a third voltage level lower than the first voltage level, wherein first driving elements of the first group of the pixels of the first row are connected to corresponding first data lines in response to the second voltage level of the gate signal, and wherein second driving elements of the second group of the pixels of the second row are connected to corresponding second data lines in response to the third voltage level of the gate signal.

13. The display device of claim 12, wherein the first row and the second row are immediately adjacent to each other with the shared gate line between the first row and the second row.

14. The display device of claim 12, wherein the level shifter is configured to generate a pseudo gate signal that transitions between the first voltage level, the second voltage level, and the third voltage, in reverse phase from the gate signal, the pseudo gate signal not being provided on the shared gate line.

15. The display device of claim 12, wherein the level shifter comprises: a first level shifter connected to a first input signal and a second input signal and including a first output connected to the shared gate line; and a second level shifter connected to the first input signal and the second input signal and including a second output that is not connected to the shared gate line.

16. The display device of claim 15, wherein the second input signal is sequentially phase-shifted from the first input signal.

* * * * *